UNITED STATES PATENT OFFICE.

WALTER O. SNELLING, OF ALLENTOWN, PENNSYLVANIA.

VULCANIZED-OIL PRODUCT.

1,376,172.　　　　　Specification of Letters Patent.　　Patented Apr. 26, 1921.

No Drawing. Original application filed May 22, 1915, Serial No. 29,765. Divided and this application filed August 8, 1919. Serial No. 316,023.

*To all whom it may concern:*

Be it known that I, WALTER O. SNELLING, a citizen of the United States, residing at Allentown, in the county of Lehigh and State of Pennsylvania, have invented certain Improvements in Vulcanized-Oil Products, (being a division of application S. N. 29,765, filed May 22, '15,) of which the following is a specification.

The general object of my invention is the preparation of cohesive and plastic masses possessing certain of the general properties of rubber, and capable of being used in part as a substitute thereof, and in part as compounding ingredients, capable when mixed with other substances such as resins, rubber, gutta percha, and like materials, of yielding products having advantageous properties which by vulcanization or other appropriate treatment may be still further modified and changed to yield products having desirable properties of cohesiveness, toughness, elasticity and plasticity.

In my application above referred to, of which this is a division, I have disclosed methods of producing rubber-like products by vulcanizing a vegetable oil under conditions which permit of the later transformation of the original vulcanized product into a tough, cohesive and plastic product, and I have also disclosed a method by which related vulcanized oil products of fluid nature and unique properties may be prepared.

In my said application I disclosed, but did not specifically claim, certain modifications of my general method of preparing plastic vulcanized oil products, and the object of my present application is to cover a modified process of preparing plastic vulcanized oils.

It has long been known that when a fatty oil is admixed with a small amount of sulfur chlorid, a reaction occurs with the production of a body very different in nature from the original oil. The reaction is generally recognized to be very similar to the reaction which occurs when rubber is brought in contact with sulfur chlorid.

During the reaction between a fatty oil and sulfur chlorid heat is evolved, and vapors of a peculiarly irritant and offensive nature are driven off, these vapors strongly and rapidly affecting the eyes and all mucous surfaces. Although the chemical nature of these vapors is not fully known to me, I have identified hydrochloric acid gas and sulfur chlorid vapors as being present in the material, and in addition have shown the presence of certain other bodies of unknown composition.

I have discovered that when ordinary factis is kept in contact with these vapors for a prolonged period, it undergoes a remarkable and deep-seated change, as a result of which the solid and non-plastic factis is transformed into a plastic, cohesive mass possessing many of the properties of unvulcanized rubber or caoutchouc. Apparently the vapors react on the factis in some manner, to reduce the size of the molecular aggregates of which the factis is made up, and to increase the attractions which such individual aggregates exert upon each other. In the original factis the chemical affinities are sufficiently satisfied so that few residual affinities capable of producing cohesion between fresh surfaces exist, while in the product resulting from treatment by my process, a very considerable number of residual or unsatisfied affinities exist, so that two surfaces of the material when pressed together unite or merge, and on endeavoring to separate them the molecular attraction in the zone at which contact originally took place seems as strong as the molecular attraction in all other portions of the material. This is a characteristic of well masticated caoutchouc or raw rubber, but is shown by few other bodies of tough and plastic nature, and it is this and other related characteristics which give to my new products their interest and their commercial value.

In practising my present invention I react on a vulcanizable oil with sulfur chlorid, and I collect the abundant fumes or vapors which are evolved by the mass during the reaction period. The fumes or vapors are readily collected and may be maintained in highly active condition for a long period of time, and particularly when retained under superatmospheric pressure, or when retained at atmospheric pressure but reduced temperature.

By exposing factis to the vaporous reaction products previously described, and maintaining the factis in contact with such vaporous reaction products for some time, the factis undergoes a peculiar change. This change is at first slow, but soon becomes more rapid and active, and the solid factis becomes at first "wilted" and soft as the size of the molecular aggregates becomes smaller. The action may be interrupted when a test sample removed from the container shows the material to be suitably soft, or the reaction may be allowed to go on until the factis is completely reduced to a liquid condition by the breaking down of the molecular aggregates to a relatively small size.

It is evident that the vaporous reaction product produced by the action of sulfur chlorid on a fatty oil may be utilized in the subsequent depolymerizing treatment of the factis obtained in the same step, or the separated vaporous reaction products may be utilized in the treatment of other factis produced in some entirely separate operation or even by some entirely separate method.

I do not claim in this application the depolymerization of factis by means of sulfur chlorid vapors, since this forms the subject-matter of my copending application S. N. 316,022 filed Aug. 8, 1919. It is true that the sulfur chlorid vapors which are present in the reaction product evolved on the vulcanization of a fatty oil by sulfur chlorid contain sulfur chlorid vapors, and it is no doubt also true that the effectiveness of the reaction products in bringing about depolymerization of factis is in part due to the contained sulfur chlorid. I have discovered however, that the action of the vaporous reaction products is stronger and more pronounced than can be accounted for by the amount of sulfur chlorid which is contained in these vapors, and I believe that the hydrochloric acid gas, and also other materials which have been shown to be present but whose chemical nature has not been completely identified, have in themselves depolymerizing action, and also the ability to assist the sulfur chlorid vapors present in their depolymerizing action.

Accordingly the purpose of my present application is to specifically claim as depolymerizing agents in the treatment of vulcanizable oil to produce therefrom plastic and cohesive products, the vaporous products which result from the reaction of a fatty oil and sulfur chlorid.

In connection with my present invention I may of course utilize any of the methods of procedure outlined in my copending application S. N. 29,765, of which this is a division, and I may similarly make use of any of the accelerating agents or other products mentioned in the application referred to. Thus, for example, in preparing factis for depolymerization in accordance with my present invention I may add methyl or ethyl alcohol to assist in the subsequent depolymerization, or I may use a sulfonated fatty acid or an hydroxyl fatty acid or other accelerating agent for the same purpose. In preparing my factis for depolymerization I may use a diluent such as carbon bisulfid or benzene to modify the rapidity with which the vulcanizing reaction occurs. After preparing a suitable factis, and depolymerizing same to a suitable extent, I may stop the further depolymerizing action by washing the resulting product with water, and I may modify the characteristics of the resulting product by any of the means which have been already described in the application referred to. My present application relates specifically to the treatment of factis, prepared in any manner, by exposing it in a closed space to the vapors produced by the reaction of a fatty oil with sulfur chlorid, or by exposing factis to vapors of similar constitution or containing some or all of the active chemical agents of such vapors, until the desired polymerization of the product is brought about.

It will be evident that many modifications may be made without departing from the essential principles of the process disclosed. My invention should therefore not be considered as being limited to the specific details given, but should be understood to cover all equivalents of the materials and methods that have been specifically mentioned, and no limitation should be imposed upon my invention except such as are indicated in the appended claims.

I claim as my invention:

1. The process that comprises confining a mixture of a vulcanizable oil and sulfur chlorid in the presence of the vapors produced by their reaction under superatmospheric pressure until depolymerization of the vulcanized product which is formed at first occurs.

2. The process of producing a soft plastic vulcanized oil product that comprises mixing about 34 parts of cottonseed oil, about 23 parts of carbon bisulfid and about 26 parts of ethyl alcohol, agitating the mixture to produce an intimate emulsion, adding about 17 parts of sulfur chlorid, stirring until the mixture tends to boil, pouring the mixture in a thin film upon a cold surface, curing the said film by allowing it to remain for some time in a closed vessel in contact with the gases produced in the vulcanizing reaction, boiling the cured film in water, and mechanically working the resulting mass.

3. The process that comprises depolymerizing a vulcanized oil product in the presence of gaseous hydrochloric acid.

In testimony whereof. I have hereunto subscribed my name this 7th day of August, 1919.

WALTER O. SNELLING.